(12) United States Patent
Schulze et al.

(10) Patent No.: US 7,726,702 B2
(45) Date of Patent: Jun. 1, 2010

(54) FLANGE CONNECTION FOR PIPE

(75) Inventors: Dieter Schulze, Gutersloh (DE); Peter Rutz, Oerlinghausen (DE); Norbert Steinmeyer, Lage (DE); Martin Ziehl, Hövelhof (DE); Andreas Udhofer, Gutersloh (DE)

(73) Assignee: Parker Hannifin GmbH & Co. AG, Bielefeld (DE)

( * ) Notice: Subject to any disclaimer, the term of this patent is extended or adjusted under 35 U.S.C. 154(b) by 0 days.

(21) Appl. No.: 12/184,344

(22) Filed: Aug. 1, 2008

(65) Prior Publication Data

US 2009/0008932 A1 Jan. 8, 2009

Related U.S. Application Data

(63) Continuation of application No. PCT/EP2007/001027, filed on Feb. 7, 2007.

(51) Int. Cl.
F16L 23/00 (2006.01)
(52) U.S. Cl. .................. 285/414; 285/368; 285/412
(58) Field of Classification Search ......... 285/368, 285/412, 414
See application file for complete search history.

(56) References Cited

U.S. PATENT DOCUMENTS

| | | | | |
|---|---|---|---|---|
| 381,869 A | * | 4/1888 | Williams | 285/368 |
| 969,423 A | * | 9/1910 | Tanner et al. | 285/368 |
| 1,497,497 A | * | 6/1924 | Gapp | 285/368 |
| 1,820,020 A | | 8/1931 | Hewitt | |
| 2,880,020 A | * | 3/1959 | Audette | 285/414 |
| 2,919,936 A | * | 1/1960 | Hurley | 285/368 |
| 3,030,253 A | * | 4/1962 | St John et al. | 285/368 |
| 3,352,577 A | * | 11/1967 | Medney | 285/368 |
| 3,399,908 A | * | 9/1968 | Kurtz | 285/368 |
| 3,537,731 A | | 11/1970 | Reddy | |
| 3,702,199 A | * | 11/1972 | Brooks et al. | 285/368 |
| 4,432,572 A | * | 2/1984 | Thalmann | 285/412 |
| 4,702,498 A | * | 10/1987 | Mueller et al. | 285/368 |
| 4,874,190 A | * | 10/1989 | Reynolds | 285/368 |
| 5,120,086 A | * | 6/1992 | Nock | 285/414 |
| 5,738,385 A | * | 4/1998 | Homann et al. | 285/368 |

FOREIGN PATENT DOCUMENTS

| | | |
|---|---|---|
| DE | 860 583 C | 7/1935 |
| DE | 615 712 C | 12/1952 |

(Continued)

OTHER PUBLICATIONS

International Search Report in corresponding International Application No. PCT/EP2007/001027.

(Continued)

*Primary Examiner*—David E Bochna
(74) *Attorney, Agent, or Firm*—John A. Molnar, Jr.

(57) ABSTRACT

Assembly for connecting a pipe having a flanged end in fluid communication with an opposing part. The assembly includes an insert received coaxially within the pipe end and having a forward end face extending axially beyond the pipe end, a clamp ring received coaxially over the pipe end, and a flange piece which is fastenable to the opposing as received coaxially over the clamp ring. As the flange piece is fastened to the opposing part, the forward end face of the insert is urged into a sealable engagement against a confronting surface of the opposing part.

9 Claims, 2 Drawing Sheets

FOREIGN PATENT DOCUMENTS

| | | | |
|---|---|---|---|
| DE | 35 43 539 | A | 8/1986 |
| DE | 195 07 854 | A1 | 9/1995 |
| GB | 416 1733 | A | 9/1934 |
| GB | 85 03 342 | U1 | 5/1985 |
| GB | 87 07 154 | U1 | 7/1987 |

OTHER PUBLICATIONS

Page U28 (ISO-6162—Four-Bolt Flange Connection) of Parker Hannifin Corporation Catalog 4300 for Industrial Tube Fittings, Adapters and Equipment.

* cited by examiner

FLANGE CONNECTION FOR PIPE

CROSS REFERENCE TO RELATED APPLICATIONS

This application is continuation of copending International Application No. PCT/EP2007/001027 filed Feb. 7, 2007, which designated the United States, and which claims priority to German Patent Application No. DE 10 2006 007 425.4, filed Feb. 17, 2006, the disclosures of which are expressly incorporated herein by reference.

BACKGROUND OF THE INVENTION

The invention pertains to a flange connection in a design as a pipe connection device with a screw-on flange part, set on the outside of the pipe to be connected to by means of at least two screws with a counter piece, whereas a sleeve formed insert piece adapted to the contour of the connecting pipe with widened end can be inserted into the pipe provided with the widened end, said insert piece forming the pipe connection on its outer face and whereupon the screw-on flange part overlaps an additional clamping ring, with its inside contour matching the contour of the widening of the pipe end, slid on the outside of the widened pipe end.

A flange connection featuring screw couplings is known, for example, from the ISO-norm 6162 or 6164. Such flange connections are suitable and designated for the connection of two pipes together as well as for the connection of a pipe end with a connecting block, for example with a valve block. In the case of the known flange connections, standard ISO flange parts sit in each case on a formed pipe end fitting with a stepped outside contour corresponding to the ISO flange part, which is joined with the pipe to be connected by means of pipe-to-pipe weld joint. Herewith there is the disadvantage that the fabrication of the pipe end pieces, as well as their welding on the pipe to be connected, is laborious, whereas the necessary weld joint displays a certain weak spot in the case of later application of the pipe-flange-connection.

A flange connection of another design with a flange piece different from the ISO standards is described in the GB PS 1 232 938. In the case of the known pipe connection, the end of the pipe to be connected has a conically formed widening into which an insert piece featuring a conical outer surface is pushed. The insert piece has a sleeve form constructed with a central opening corresponding to the pipe cross section of the cylindrical pipe body, so that a flow passage from the cylindrical pipe body through the insert piece is provided. The outer face surface of the insert piece is either attached against a connecting block or against the outer face surface of an insert piece pushed into the pipe end of a second pipe, so that two pipe ends can be connected together by means of appropriately assigned insert pieces. Corresponding conical formed clamp pieces, which are overlapped by a flange piece, are arranged on the outside of the pipe end with the widened form. This flange piece is screwable by means of corresponding screw connections either with the connecting block or with a flange piece arranged on a second pipe end, so that the pipe connection is producible by means of the tightening of the corresponding screws. The flange piece has a conical form on its inner surface surrounding the clamp piece corresponding to the conical form of the clamp piece.

Associated with this pipe connection device is firstly the disadvantage that the transition of the conical widening in the cylindrical pipe body has a kinking point which, in the case of high vibration stress of the connected pipe or the pipes connected to each other, can result in a corresponding sensitivity to breakage. Furthermore there has been the result with the known pipe connection devices, especially in the case of large pipe diameters and high pressures, that the conical widening of the pipe body thereto tends to evade the cylindrical pipe form and thereby to slip out of the pipe connecting device.

A pipe connection of another design is known from GB 740 717, by which the connection of the pipe ends takes place by means of a screw nut threaded connection system. Here, in each case, clamp rings are attached to the outside of the pipe ends which have a widening end, said clamp rings having a support bearing or alternatively a male screw thread for a sleeve formed coupling nut such that the coupling nut grasping the clamp ring of one pipe end is screwed onto the clamp ring with male thread on the other pipe end and thereby pulls the clamp rings and hence the pipe ends together. Here the adapter pieces inserted into the widened pipe ends are also known. Associated with this pipe connection is the disadvantage that—as apposed to the known flange connection named at the beginning—a torsion movement is transferred to the widened area at the end of the pipes during the assembly of the screw nut coupling system, such that the pipes to be connected possibly rotate at the same time. This effect is, as a rule, undesirable in the case of the adjustment of pipes to be connected together.

SUMMARY OF THE INVENTION

The basis for the invention is the requirement to develop a flange connection with the kinds of features that avoid the need for special pipe end pieces to be produced or welded onto for the acceptance of standardized flange pieces.

The solution of this task, including advantageous designs and further embodiments of the invention, follows from the contents of the patent requirements, which are attached to this description.

In its fundamental idea, the invention provides that the widening of the pipe end displays a trumpet formed contour with a contouring which is running smoothly from the outer pipe end to the cylindrical pipe body without formation of a kink and which has the greatest slope in the area of the outer end of the widening and the least slope in the area of the transition to cylindrical pipe body, and that the clamp ring encompassing the end of the pipe has an outside shape which is form-fitting insertable in a prefabricated standard flange piece. There is the advantage with the invention that, as a result of the flowing transition from the widening of the pipe end to the cylindrical pipe body, the danger of breaking from vibration stress is reduced because an abrupt narrow bending point is eliminated. Since, according to the invention, the contour in the area of the outside end of the widening shows the greatest slope and in the area of the transition of the cylindrical pipe body the least slope, the end of the pipe can be better held by means of the clamp ring attached outside so that a corresponding reliability of the pipe connection assembly is realized, even for large pipe diameters and high pressures. A buckling of the pipe body is prevented to a large degree due to the rising slope of the pipe gradient to the pipe end by way of the trumpet formed contour.

A further advantage results from the fact that the respective clamp ring to be inserted has an outside contour which makes a form fit in a standard ISO-flange piece or can be pressed therein. For this reason any standard flange according to ISO can be used.

According to a demonstration sample the invention is designed so that the trumpet formed contour of the pipe end in the transition to the cylindrical pipe body is constructed in parabola shape; other appropriate curves for the transition are likewise possible.

According to a demonstration sample of the invention, it is stipulated that the clamp ring is designed with a friction increasing profile on its inner trumpet shaped surface which is adjacent to the widening of the pipe end. Hereby there is the associated advantage that, by means of the profiling, the clamping effect of the clamp ring is strengthened, especially in the case of pipes whose surface area allows for a premature slipping under corresponding loading. In detail, grooving with intermediate embossed protruding cusps on the inner surface of the clamp ring can be envisioned as a design example for an appropriate profile.

In an alternative design form it can be envisioned that the clamp ring is provided with a friction increasing coating which can consist of granulated material applied on its trumpet formed inner surface.

According to a design example of the invention it is stipulated that the one insert piece with a trumpet formed contour has a cylindrical appendage extending into the cylindrical pipe body. Hereby there is the associated advantage that the insert piece, in addition to its form fitting installation on the widening of the pipe end, is fixed axially and radially in the pipe to be connected.

According to one design example of the invention it is stipulated that the insert piece has a channel for the retaining of a seal on its outer surface in the area of its trumpet formed contour.

Furthermore it can be stipulated that the insert piece has a channel for retaining a seal on its outer front surface. The configuration of the appropriate seal on the insert piece is incidentally known from GB PS 1 232 938 taken from "zur Bildung der Gattung".

It can be stipulated that the insert piece is pressed into the pipe end before the installation of the pipe connection device into the pipe end.

BRIEF DESCRIPTION OF THE DRAWINGS

For a fuller understanding of the nature and objects of the invention, reference should be had to the following detailed description taken in connection with the accompanying drawings wherein.

The drawings will be described further in connection with the following Detailed Description of the Invention.

DETAILED DESCRIPTION OF THE INVENTION

Figure 1:
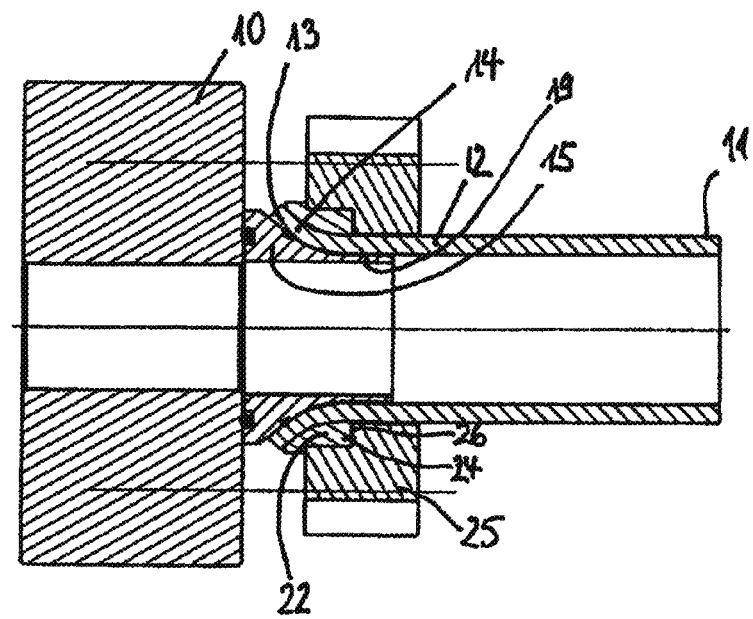
FIG. 1 shows a pipe connection device with a pipe attachment to a connection block in assembled state in a cross-section view.

As initially follows from FIG. 1, a pipe 11 is attached to a connection block 10 by means of the pipe connection design according to the invention. The pipe 11 has a cylindrical pipe body 12 which joins to a pipe end 13 provided with a widening 14. An insert piece 15 pushed into the pipe end 13, said insert piece whose outer front face 16, positioned towards connection block 10, attaches to the outside surface of the connection block 10 when the pipe connection device is assembled and thus establish the connection of the pipe 11 with the connection block 10. In the front face 16 of the insert piece 15, there is a channel 17 designed with an inserted seal 18 so that a sealing contact of the insert piece 15 against the connection block 10 is made. The insert piece 15 is constructed in sleeve form and has an opening 28 for the streaming medium through the pipe 11 into the connection block 10. The widening 14 of the pipe end 13 is formed in a trumpet-shaped contour with a fluent running contouring from the outside pipe end to the cylindrical pipe body 12 without the development of a kink. Accordingly, the insert piece 15 which is pushed into the pipe end 13 likewise has an outside shape with a trumpet formed contour corresponding to the widening 14. For better guidance of the insert piece 15 into the pipe end 13 the insert piece 15 with a cylindrical appendage 19 protrudes into the cylindrical pipe body 12. The insert piece is furnished with a channel 20 for the incorporation of a seal 21 on its outside surface in the area of the widening 14 of the pipe end 13 so that a sealing contact of the insert piece 15 against the pipe 11 is provided for.

A clamp ring 22 is pressed onto the outside of the pipe end 13 for the attachment of the pipe end 13 with the therein inserted insert piece 15 against the connection block 10. Said clamp ring, with inside surface 23 having a contour corresponding to the widening 14 of the pipe end 13, is thus likewise formed with a trumpet shaped gradient. On its outside, the clamp ring 22 is provided with a step 24 so that the outside cross-section of the clamp ring 22, reduced by the step 24 and brought to a rectangular form, can be inserted or alternatively pressed into a corresponding step formed recess 26 of the flange part 25 overlapped by the clamp ring 22. In the case of the flange piece 25, it is about a commercial, prefabricated standard flange piece, for example corresponding to the ISO standards 6162 or alternatively 6164. As not described in detail, the flange part 25 can be firmly screwed to the connection block 10 by means of several screws distributed on its circumference. Thereby the force applied by the screws acts from the flange piece onto the clamp ring 22, which on its part transfers this force to the widening 14 of the pipe end 13, whereby the pipe end 13 presses the insert piece 15 into sealing contact on the connection block 10.

Figure 2:
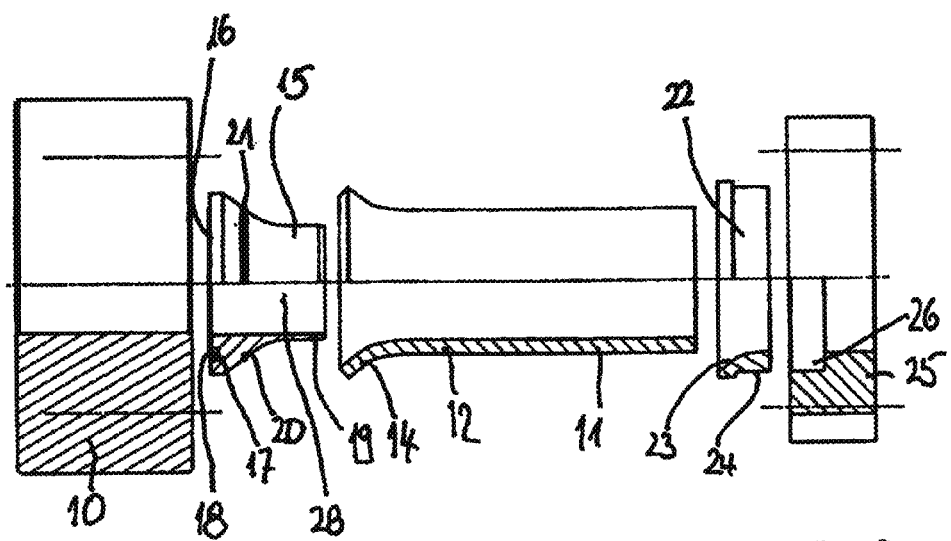
FIG. 2 shows the device of FIG. 1 in unassembled state in an expanded representation of the individual parts.

The above described component parts of the pipe connection device are more apparent from FIG. 2, whereby the flange piece for the design example illustrated in FIGS. 1 and 2 is constructed as a flat flange piece.

Figure 3:
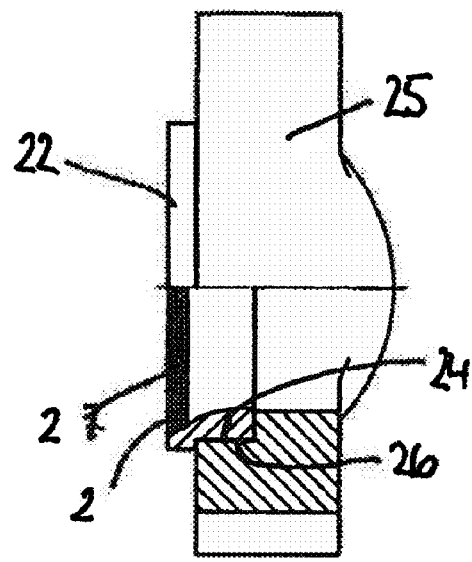
FIG. 3 shows a clamp ring and flange piece of an alternative embodiment of the pipe connection device of the present invention.

But as follows from FIG. 3, the flange piece can also be formed as a standard flange piece in arched construction whereby, in the case of the design example represented in FIG. 3, the clamp ring 22 is provided with a profile 27 on its inner surface 23 adjoining the widening 14 of the pipe end 13. This profile can, for example, be constructed with arrayed creases with in-between embossed protruding cusps.

Figure 4:
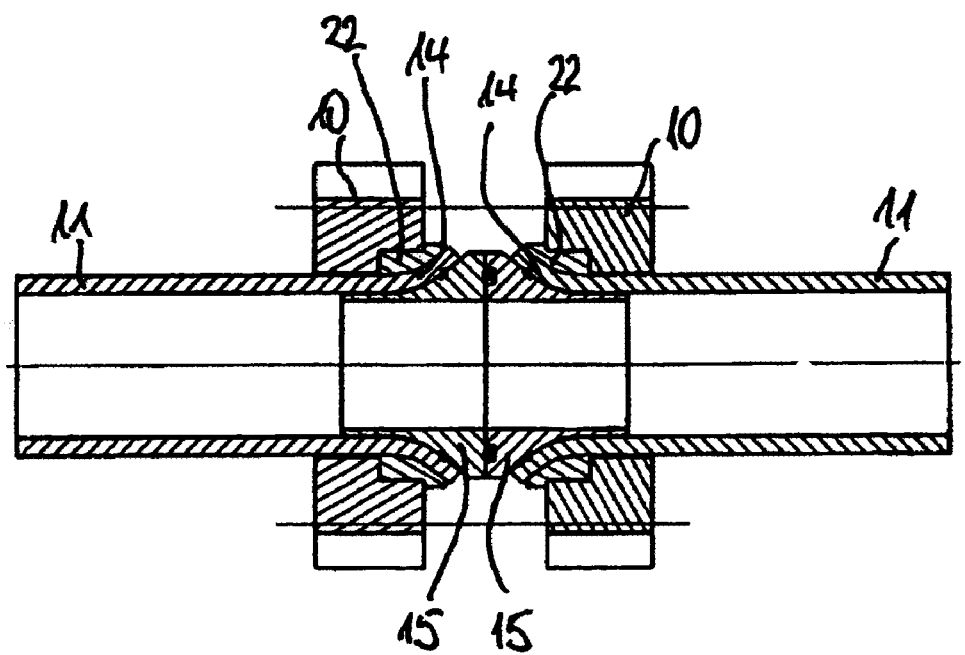
FIG. 4 shows the use of a pair of the pipe connection device of FIG. 1 for the connection of two pipe ends with each other.

Also as follows from FIG. 4, two pipes 11 can be connected with each other by means of appropriate pipe connection devices, whereby flange pieces 25 are arranged on both pipes as described. The flange pieces are connected together by means of an appropriate screw connection such that the insert pieces 15, fitting into the two pipe ends, are pressed against each other by means of the applied forces. As shown in FIG. 4, the insert pieces 15 are not identically formed in so far as only one of the two insert pieces 15 is provided with an appropriate sealing 18 on its face surface; the face surface 16 of the other (left in the illustration of FIG. 4) insert piece 15 is constructed flat for sealing purposes.

As it is anticipated that certain changes may be made in the present invention without departing from the precepts herein involved, it is intended that all matter contained in the foregoing description shall be interpreted as illustrative and not in a limiting sense. All references including any priority documents cited herein are expressly incorporated by reference.

What is claimed is:

1. An assembly for connecting a pipe in fluid communication with an opposing part, the pipe having a generally cylindrical pipe body, the assembly comprising:

a flanged end of the pipe extending from a transition portion to the pipe body having a first slope, to an outer end portion having a second slope greater than the first slope, the pipe end having a generally radial inner surface and a generally radial outer surface:

an insert having a reward end received coaxially into the pipe end and a forward end face extending axially beyond the pipe end, the insert being nested within the radial inner surface of the pipe end as having a generally radial outer surface with a first slope adjacent the rearward end contoured to the first slope of the pipe end and a second slope adjacent the forward end face contoured to the second slope of the pipe end;

a clamp ring received coaxially over the pipe end, the clamp ring having a generally radial inner surface and a radial outer surface defining a forward shoulder portion and a rearward portion, the outer surface of the tube end nesting within the inner surface of the clamp ring; and a flange piece received coaxially over the clamp ring, the flange piece having a radial inner surface defining a generally annular recess, the rearward portion of the clamp ring nesting within the recess, the flange piece being fastenable to the opposing part, whereby as the flange piece is fastened to the opposing part, the forward end face of the insert is urged into a sealable engagement against a confronting surface of the opposing part, and wherein the opposing part comprises a second said assembly and the forward end face of the insert of the second assembly forms the confronting surface of the opposing part and the flange piece of the first assembly is fastenable to the flange piece of the second assembly.

2. An assembly for connecting a pipe in fluid communication with an opposing part, the pipe having a generally cylindrical pipe body, the assembly comprising:

a flanged end of the pipe extending from a transition portion to the pipe body having a first slope, to an outer end portion having a second slope greater than the first slope, the pipe end having a generally radial inner surface and a generally radial outer surface;

an insert having a reward end received coaxially into the pipe end and a forward end face extending axially beyond the pipe end, the insert being nested within the radial inner surface of the pipe end as having a generally radial outer surface with a first slope adjacent the rearward end contoured to the first slope of the pipe end and a second slope adjacent the forward end face contoured to the second slope of the pipe end;

a clamp ring received coaxially over the pipe end, the clamp ring having a generally radial inner surface and a radial outer surface defining a forward shoulder portion and a rearward portion, the inner surface of the clamp ring being formed as having a friction-increasing profile comprising a series of ridges, and the outer surface of the tube end nesting within the inner surface of the clamp ring; and a flange piece received coaxially over the clamp ring, the flange piece having a radial inner surface defining a generally annular recess, the rearward portion of the clamp ring nesting within the recess, the flange piece being fastenable to the opposing part, whereby as the flange piece is fastened to the opposing part, the forward end face of the insert is urged into a sealable engagement against a confronting surface of the opposing part.

3. An assembly for connecting a pipe in fluid communication with an opposing part, the pipe having a generally cylindrical pipe body, the assembly comprising:

a flanged end of the pipe extending from a transition portion to the pipe body having a first slope, to an outer end portion having a second slope greater than the first slope, the pipe end having a generally radial inner surface and a generally radial outer surface;

an insert having a reward end received coaxially into the pipe end and a forward end face extending axially beyond the pipe end, the insert being nested within the radial inner surface of the pipe end as having a generally radial outer surface with a first slope adjacent the rearward end contoured to the first slope of the pipe end and a second slope adjacent the forward end face contoured to the second slope of the pipe end;

a clamp ring received coaxially over the pipe end, the clamp ring having a generally radial inner surface and a radial outer surface defining a forward shoulder portion and a rearward portion, the inner surface of the clamp ring being formed as having a friction-increasing coating comprising a granulated material, and the outer surface of the tube end nesting within the inner surface of the clamp ring; and a flange piece received coaxially over the clamp ring, the flange piece having a radial inner surface defining a generally annular recess, the rearward portion of the clamp ring nesting within the recess, the flange piece being fastenable to the opposing part, whereby as the flange piece is fastened to the opposing part, the forward end face of the insert is urged into a sealable engagement against a confronting surface of the opposing part.

4. The assembly of claim 1, 2, or 3 further comprising a least a pair of screws, the screws being receivable through the flange piece and being screwable into the opposing part for fastening the piece thereto.

5. The assembly of claim 1, 2, or 3 wherein the flange piece has a forward axial end face disposed against the shoulder portion of the clamp ring.

6. The assembly of claim 1, 2, or 3 wherein each of the inner and outer surfaces of the pipe end, the outer surface of the insert, and the inner surface of the claim clamp ring each has a generally parabola-shaped profile.

7. The assembly of claim 1, 2, or 3 further comprising a seal ring interposed between the forward end face of the insert and the confronting surface of the opposing part.

8. The assembly of claim 1, 2, or 3 further comprising a seal ring interposed between the outer surface of the insert and the inner surface of the pipe end.

9. The assembly of claim 1, 2, or 3 wherein the insert rearward end extends beyond the transition portion of the pipe end into the pipe body.

* * * * *